United States Patent
Cassidy

(10) Patent No.: US 8,593,110 B2
(45) Date of Patent: Nov. 26, 2013

(54) DEVICE AND METHOD OF BATTERY DISCHARGE

(75) Inventor: David E. Cassidy, Chelmsford, MA (US)

(73) Assignee: General Electric Company, Schenectady, NY (US)

(*) Notice: Subject to any disclaimer, the term of this patent is extended or adjusted under 35 U.S.C. 154(b) by 454 days.

(21) Appl. No.: 12/949,902

(22) Filed: Nov. 19, 2010

(65) Prior Publication Data

US 2012/0126751 A1    May 24, 2012

(51) Int. Cl.
*H02J 7/00* (2006.01)

(52) U.S. Cl.
USPC ............................ 320/116; 320/118; 320/135

(58) Field of Classification Search
USPC .......................................... 320/116, 118, 135
See application file for complete search history.

(56) References Cited

U.S. PATENT DOCUMENTS

| | | | |
|---|---|---|---|
| 4,698,144 A | 10/1987 | Wainerdi | |
| 5,293,007 A | 3/1994 | Darst et al. | |
| 5,920,179 A | 7/1999 | Pedicini | |
| 6,114,835 A | 9/2000 | Price | |
| 6,278,604 B1 | 8/2001 | Patel et al. | |
| 6,624,612 B1 | 9/2003 | Lundquist | |
| 6,701,150 B1 | 3/2004 | Huang et al. | |
| 6,844,703 B2 | 1/2005 | Canter | |
| 6,873,134 B2 | 3/2005 | Canter et al. | |
| 6,891,352 B2* | 5/2005 | Miyazaki et al. | 320/118 |
| 7,058,484 B1* | 6/2006 | Potega | 700/297 |
| 7,081,737 B2 | 7/2006 | Liu et al. | |
| 7,126,312 B2 | 10/2006 | Moore | |
| 7,453,237 B2* | 11/2008 | Yamamoto | 320/118 |
| 7,777,451 B2* | 8/2010 | Chang et al. | 320/118 |
| 2005/0077875 A1 | 4/2005 | Bohley | |
| 2005/0221839 A1 | 10/2005 | Chan et al. | |
| 2005/0269988 A1 | 12/2005 | Thrap | |
| 2005/0269989 A1 | 12/2005 | Geren et al. | |
| 2006/0033475 A1 | 2/2006 | Moore | |
| 2006/0071643 A1 | 4/2006 | Carrier et al. | |
| 2006/0152194 A1* | 7/2006 | Wang et al. | 320/121 |
| 2006/0255769 A1 | 11/2006 | Liu et al. | |

(Continued)

OTHER PUBLICATIONS

Barsukow, Yevgen; Cell Balancing Using bq20zxx; Nov. 2005; Texas Instruments; pp. 1-3.

(Continued)

*Primary Examiner* — Drew A Dunn
*Assistant Examiner* — Nathaniel Pelton
(74) *Attorney, Agent, or Firm* — Andrus, Sceales, Starke & Sawall, LLP

(57) ABSTRACT

A battery pack includes a plurality of cells. A discharge circuit is electrically connected to the plurality of cells. A computer processor is electrically connected to the discharge circuit and to an input device. The computer processor operates the discharge circuit to selectively connect a first and a second discharge load of the discharge circuit to the plurality of cells. A method of discharging a battery for safe disposal includes connecting a first discharge load in parallel to a first cell. A first voltage across the first cell is monitored. A second discharge load is connected in parallel to a second cell. A second voltage is monitored across the second cell. A processor compares the first voltage and the second voltage to a predetermined cell voltage threshold. The first discharge load and the second discharge load are disconnected from the first cell and the second cell when the first and second voltages fall below the predetermined cell voltage threshold.

14 Claims, 3 Drawing Sheets

(56) References Cited

U.S. PATENT DOCUMENTS

| | | | |
|---|---|---|---|
| 2009/0230922 A1* | 9/2009 | Elder et al. | 320/126 |
| 2010/0097211 A1* | 4/2010 | Silver et al. | 340/540 |
| 2010/0237785 A1* | 9/2010 | Lee | 315/150 |
| 2010/0253284 A1* | 10/2010 | Aoki et al. | 320/118 |

OTHER PUBLICATIONS

Martinez, Carlos et al; Using Cell Balancing to Maximize the Capacity of Multi-cell Li-Ion Battery Packs; Application Note; Jun. 7, 2005; pp. 1-8.

* cited by examiner

DEVICE AND METHOD OF BATTERY DISCHARGE

BACKGROUND

The present disclosure is related to energy storage. More specifically, the present disclosure is related to a device and method of discharging a battery to improve the safety of a used battery for disposal.

Energy storage devices, such as batteries, present hazards during disposal. Particularly, modern battery pack designs, for example lithium ion polymer battery packs, can overheat if disposed of in a conventional manner. This overheating can lead to risks of fire or explosion often during a conventional disposal, a battery pack is thrown away and disposed of in a landfill or collected by a municipal garbage collection. During this collection or disposal, the battery pack may be crushed or punctured. This causes shorts between the energy cells, creating the overheating condition that may result in fire or explosion.

One current solution to eliminate these risks are specialized battery collection and disposal procedures. However, these specialized procedures add unwanted time and expense to battery disposal requirements.

BRIEF DISCLOSURE

A battery pack is disclosed herein that includes a plurality of cells. A discharge circuit is electrically connected to the plurality of cells. The discharge circuit includes a first discharge load selectively connected in parallel to a first cell and a second discharge load selectively connected in parallel to a second cell. A first switch selectively connects the first discharge load to the first cell and a second switch selectively connects the second discharge load to the second cell. An input device produces a battery discharge signal. A computer processor is electrically connected to the discharge circuit and to the input device. The computer processor operates the first switch and the second switch in response to the discharge signal to selectively connect the first and second discharge loads in parallel to the respective first and second cells. The computer processor receives a first voltage across the first cell and a second voltage across the second cell and compares the first and second voltages to a predetermined threshold voltage. The computer processor operates the first switch and the second switch to selectively disconnect the first and second discharge loads from the respective first and second cells when both the first voltage and the second voltage fall below the predetermined threshold voltage.

A system disclosed herein includes a battery with a plurality of cells. A discharge circuit is connected to the battery. The discharge circuit includes a first discharge load selectively connected in parallel to a first cell by a first switch and a second discharge load is selectively connected in parallel to a second cell by a second switch. A controller is connected to the discharge circuit. The controller includes a voltmeter that measures a voltage across the first cell and a second voltmeter that measures a second voltage across the second cell. The controller compares the first and second voltages to a predetermined threshold cell voltage. The controller operates the first switch to disconnect the first discharge load from the first cell when the first voltage falls below the predetermined threshold cell voltage. The controller operates the second switch to disconnect the second discharge load from the second cell when the second voltage falls below the predetermined threshold cell voltage.

A method of rendering a battery safe for disposal includes connecting a first discharge load in parallel to a first cell. A first voltage is monitored across the first cell. A second discharge load is connected in parallel to the second cell. A second voltage is monitored across the second cell. A processor compares the first voltage and the second voltage to a predetermined cell voltage threshold. The first discharge load and the second discharge load are disconnected from the first cell and the second cell when the first and second voltages fall below the predetermined cell voltage threshold.

DETAILED DISCLOSURE

Figure 1:
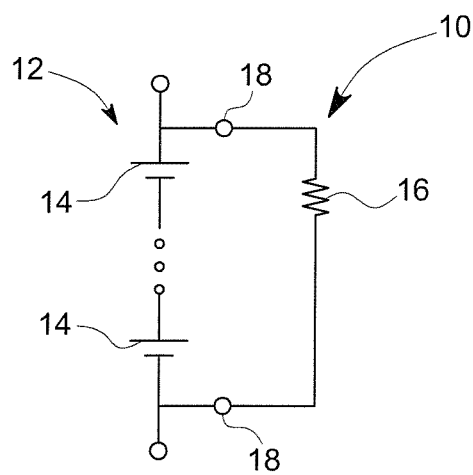
FIG. 1 depicts a prior art embodiment of a battery discharge circuit.

FIG. 1 depicts a prior art embodiment of a circuit 10 for discharging a battery 12. The battery 12 includes a plurality of cells 14 that are connected in series. A discharge load 16 is applied across the cells 14 of the battery. The discharge load 16 can be connected to the cells 14 through an interface 18. In an exemplary embodiment, the interface 18 includes a piece of insulative tape that forms an electrical barrier between the battery 12 and the discharge load 16.

In an application of this embodiment, the tape is removed from a used battery. The removal of the tape or other barrier connects the interface 18 such that the discharge load 16 is electrically coupled across the terminals of the battery 12. Once the discharge load 16 is placed across the terminals of the battery 12, the load cannot be removed and the battery 12 is discharged through the discharge load 16.

This prior art embodiment is limited as it does not control how each cell is discharged. This can lead to reverse voltage across some of the cells wherein one cell is charged in reverse by the discharge of an adjacent cell. This embodiment can further be limited in its ability to safely completely discharge the battery as unbalanced cell charges may lead to the battery being discharged while a dangerous charge remains on one or more of the cells.

Figure 2:
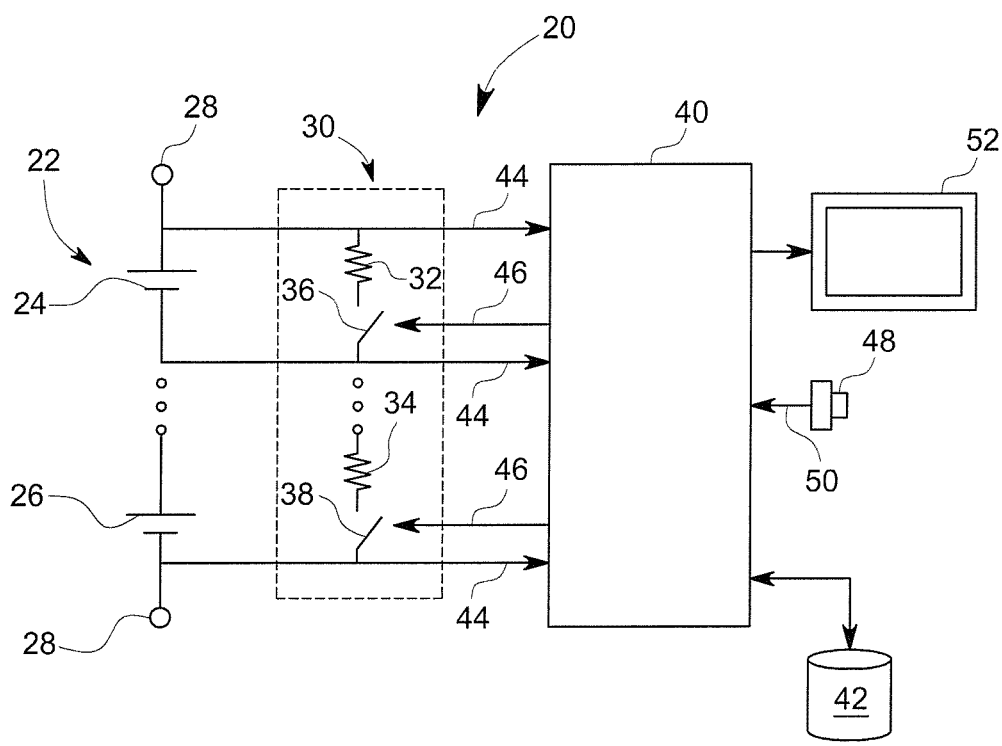
FIG. 2 is a schematic diagram of a first embodiment of a battery with a cell discharge circuit.

FIG. 2 is a schematic diagram of an embodiment of a battery pack 20. The battery pack 20 includes a battery 22 that includes at least a first cell 24 and a second cell 26. The cells 24, 26 of the battery 22 may be constructed using any of a known variety of rechargeable cell design and composition. One exemplary type of cell may be a lithium ion polymer cell; however, this is not intended to be limiting on the types of cells that may be used in embodiments currently disclosed herein. The combination of cells 24, 26 in the battery 22 create a charge across opposing terminals 28 of the battery pack 20.

A discharge circuit 30 is connected to the battery 22 between the terminals 28. The discharge circuit 30 connects a first discharge load 32 and a second discharge load 34 in parallel across the first cell 24 and the second cell 26, respectively. A first switch 36 selectively connects the first discharge load 32 in parallel across the first cell 24 and a second switch 38 selectively connects the second discharge load in parallel across the second cell 26.

While the battery pack 20 is depicted in an embodiment that includes a first cell 24 and a second cell 26, and the associated components of the discharge circuit 30, it is understood that embodiments within the scope of this disclosure include any number of cells and circuitry in the discharge circuit 30 as disclosed herein.

The discharge circuit 30 is connected to a controller 40, which in one embodiment may be a computer processor. If the controller 40 is a computer processor, the processor 40 may be connected to a non-transient computer readable medium such as computer memory 42. The computer readable medium is programmed with computer readable code that is executed by the controller 40. When the computer readable code is executed by the controller, the computer readable code causes the controller to operate in the manner described herein.

The controller 40 is communicatively connected to the discharge circuit 30 such that the controller 40 can receive signals from the discharge circuit 30 and provide signals to the discharge circuit 30. The controller receives voltages from across each of the cells 24, 26. The controller 40 uses these voltages to calculate a voltage across each of these cells individually. The controller 40 provides a control signal to each of the switches 36, 38 to selectively open and close the switches 36, 38 to connect the discharge loads 32, 34, respectively, across the cells 24, 26.

Controller 40 is further communicatively connected to an input device 48. The input device 48 may be a button or a switch that is located on an external portion of the battery pack 20. The input device 48 may require a type of encoded input, such as a proper combination of buttons or switches in order to reduce or eliminate accidental activation of the input device 48. Alternative embodiments of the input device 48 are a keyboard or number pad, while still further embodiments of the input device 48 incorporate a touch screen.

Activation of the input device 48 produces a battery discharge signal 50 that is sent to the controller 40. Upon receipt of the battery discharge signal 50, the controller 40 operates the discharge circuit 30 by providing control signal 46 to the switches 36, 38 to close the switches 36, 38 and place the discharge loads 32, 34 in parallel with each of the cells 24, 26.

The controller 40 is further communicatively connected to a graphical display 52. In an embodiment, the graphical display 52 is integrated into the battery pack 20. When the controller 40 operates the discharge circuit 30 to begin discharging the battery 22, the controller 40 operates the graphical display 52 to present an indication that the battery pack 20 is in a discharge condition. This indication provides a variety of functions. First, the operation of the graphical display 52, which in an embodiment may be an OLED display, draws energy from the cells 24, 26 of the battery 22. This helps to facilitate battery discharge. Secondly, the indication that the battery pack 20 is in a discharge condition provides a warning to a user that may have inadvertently initiated the discharge condition. In this case, the user may operate the controller, such as through the input device 48 in order to stop the discharge condition before the cells 24, 26 are discharged beyond a point of recharge. Finally, the graphical display 52 may be operated by the controller 40 to present an indication that the cell discharge is complete. The presentation of this indication remains on the graphical display 52 so long as sufficient charge remains in the cells 24, 26 to operate the graphical display 52. This provides an indication to any potential user of the battery back 20 that the battery 22 of the battery pack 20 has been fully discharged and it, therefore, is inoperable as a battery and safe for disposal.

Figure 3:
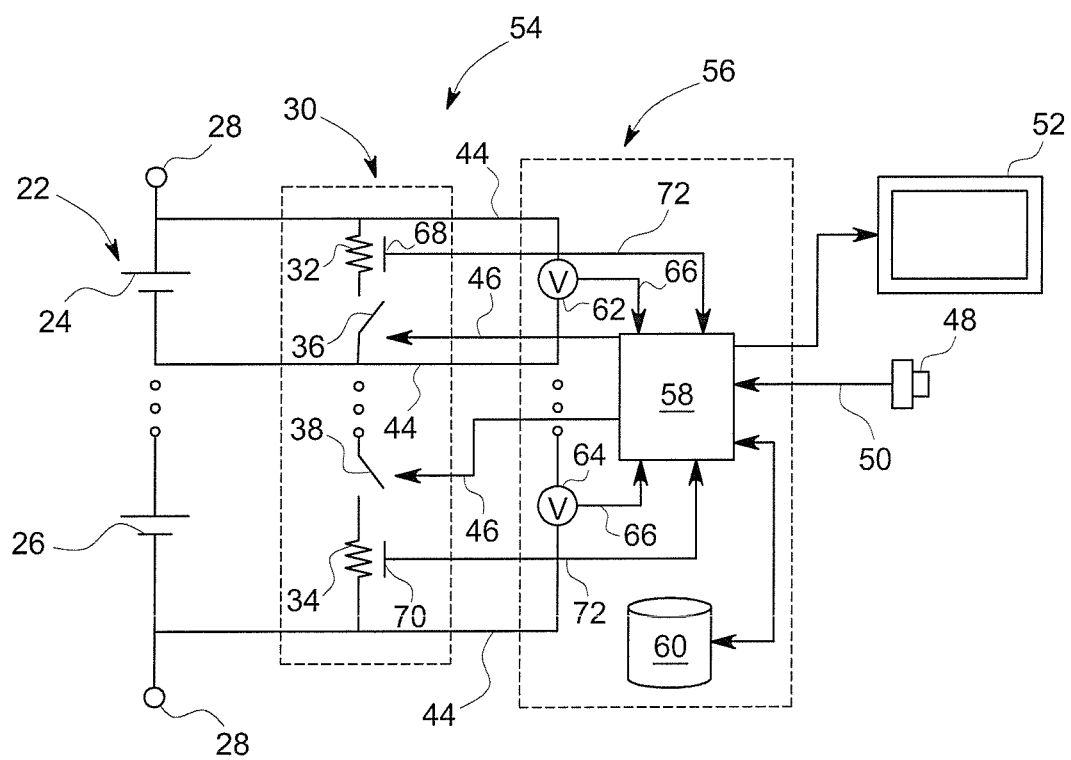
FIG. 3 is a schematic diagram of a second embodiment of a battery with a cell discharge circuit.

FIG. 3 depicts an alternative embodiment of a battery pack 54. In the embodiment depicted in FIG. 3, like reference numerals are used to identify like components between the embodiments depicted in FIG. 2 and FIG. 3.

The battery pack 54 specifically includes an alternative embodiment of the controller 56. The controller 56 includes a microprocessor 58 that is communicatively connected to a non-transient computer readable medium 60 of the controller 56. The computer readable medium 60 is programmed with computer readable code that is accessed and executed by the processor 58. Upon execution of the computer readable code by the processor 58, the processor carries out the functions as described in further detail herein.

The controller 56 further includes a first voltmeter 62 and a second voltmeter 64. The voltmeters 62, 64 receive voltage signals 44 from nodes between the cells 24, 26 of the battery 22. In the battery pack 54, the first voltmeter 62 measures the voltage across the first cell 24 and the second voltmeter 64 measures the voltage across the second cell 26. The first and second voltmeters 62, 64 provide voltage signals 66 to the processor 58 and are indicative of the measured voltages.

The microprocessor 58 operates in the manner as disclosed in further detail herein to produce control signals 46 that are sent to the switches 36, 38 to operate the switches 36, 38 in between an open position and a closed position. It is to be understood that when the switches 36, 38 are in the open position, the discharge loads 32, 34 are not connected to the cells 24, 26. When the switches 36, 28 are in the closed position, the discharge loads 32, 34 are connected to the cells 24, 26.

A first temperature sensor 68 is associated with the first discharge load 32 and a second temperature sensor 70 is associated with the second discharge load 34. The temperature sensors 68, 70 provide respective temperature signals 72 back to the processor 58. In an exemplary embodiment, the temperature sensors 68, 70 are a type of thermistor, such that a measured voltage across the temperature sensor 68, 70 varies in a known manner with respect to a detected temperature.

In operation of the controller 56, the processor 58 receives a battery discharge signal 50 from an activated input device 48. The execution of computer readable code by the processor 58 causes the processor 58 to interpret the battery discharge signal 50 to initiate the discharge of the cells 24, 26 of the battery 22. The processor 58 sends control signals 46 to the switches 36, 38 in order to place the switches 36, 38 in a closed position that connects the discharge loads 32, 34 in parallel across the cells 24, 26, respectively. This begins discharge of the cells 24, 26 of the battery 22.

The processor 58 may further operate the graphical display 52 in order to present an indication, such as a textual indication, that the battery pack 54 is operating in a discharge condition.

During the discharge process, the processor 58 receives voltage signals 66 from the first voltmeter 62 and the second voltmeter 64. The voltage signals 66 monitor the remaining voltage across each of the cells 24, 26. The processor 58 uses this to monitor the progression of the cell discharge. Each of the cells 24, 26 has a minimal cell charge that the cell must stay above in order to be able to be successfully recharged. If the cell is discharged below this minimum recharge voltage threshold, then the cell is considered to be fully discharged. When each of the cells 24, 26 of the battery 22 are discharged below this threshold voltage, then the battery pack 54 is considered to be fully discharged and rendered safe for disposal.

While, in some embodiments, the battery pack 54 may include additional circuitry such that the cells 24, 26 are evenly discharged (not depicted), in these embodiments the cells 24, 26 will fall below the threshold recharge voltage at the same time. However, in an alternative embodiment, the cells 24, 26 do not remain in balance during battery use and therefore the processor 58 may detect that one or more of the cells falls below the threshold voltage before one or more other cells do so. In this event, the controller 58 may operate one or more of the switches 36, 38 in order to remove the discharge load from across the fully discharged cells. In an alternative embodiment, the processor 58 may operate the discharge circuit 30 such as to disconnect the discharge loads 32, 34 only after each of the measured cell voltages falls below the predetermined threshold.

In a still further embodiment, the temperature signals 72 are processed by the processor 58 such as to monitor a temperature of the discharge loads 32, 34. Various alternative configurations or operation of the discharge circuit 30 may be used to effectively monitor and counteract overheating of the discharge circuit 30 while discharging the cells 24, 26. The discharge of the energy from the cells 24, 26 across the discharge loads 32, 34 converts the energy stored in the cells 24, 26 into heat as it passes through the discharge loads 32, 34. The temperature sensors 68, 70 monitor the temperature of the discharge loads and if an excessive temperature is detected, the controller 58 may provide a control signal 46 to one or more of the switches 36, 38 in order to disconnect the discharge load 32, 34 from a respective cell 24, 26, or from all of the cells.

In an alternative embodiment, the discharge loads 32, 34 may comprise a plurality of loads (not depicted) in parallel with the respective cells 24, 26. These discharge loads spread out the dissipated energy and reduces heat and temperature build up within the discharge circuit 30.

In a still further embodiment, each of the plurality of discharge loads (not depicted) are independently connected and operated by switches (not depicted) that are connected to the processor 58. The processor 58 can then determine a number of parallel discharge loads to be connected across the cell 24 in order to maintain the discharge circuit 30 in a desirable temperature range.

As with the battery pack 20, once the cells 24, 26 have been fully discharged to below the predetermined threshold voltage, then the processor 58 operates the graphical display 52 in order to present an indication that the cells have been fully discharged and that the battery pack 54 is now inoperable and ready for disposal. The processor 58 may execute computer readable code such that the processor uses any remaining cell voltage to maintain the battery discharge indication on the graphical display 52. The graphical display 52, as well as the processor 58, require energization provided by the cells 24, 26 and thus, these operations further drain energization from the cells as the battery pack 54 awaits disposal.

Figure 4:
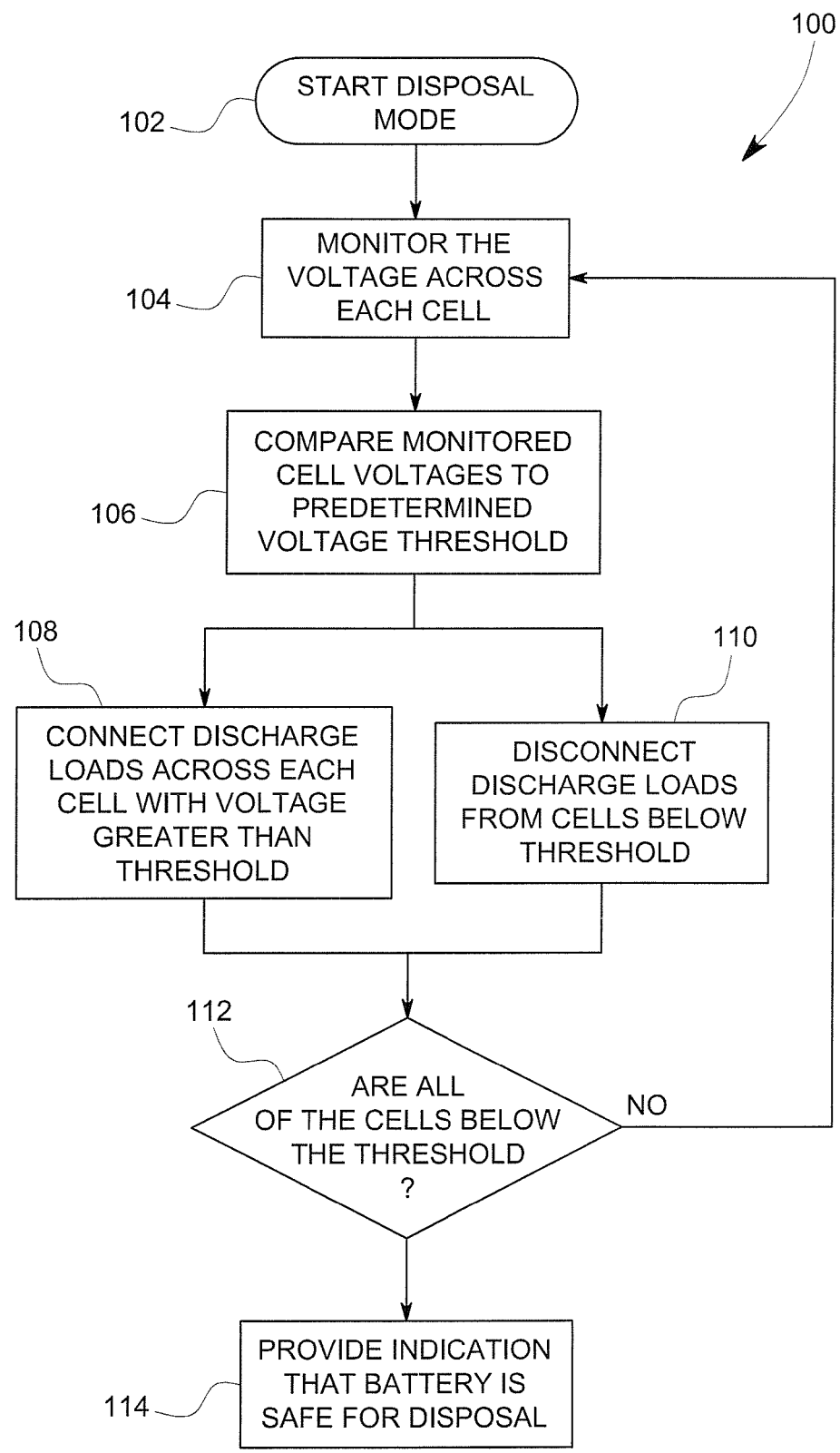
FIG. 4 is a flow chart that depicts an embodiment of a method of rendering a battery safe for disposal.

FIG. 4 is a flow chart depicting an embodiment of a method 100 of discharging a battery such that it is safe for disposal.

The method 100 begins at 102 by initiating a disposal mode. The disposal mode may be initiated after receiving a signal from the input device described above.

At 104, voltage across each of the cells is monitored. The monitoring of the voltage across each of the cells at 104 may include the analog measurement of the voltage across each cell with this analog voltage measurement being digitized and provided to a processor of the controller. Alternatively, voltage potential at nodes in the battery between each of the cells may be digitized and provided directly to a processor, such that the processor determines the differential voltages across each of the cells.

The monitored voltages are compared at 106 to a predetermined cell voltage threshold. The predetermined cell voltage threshold is a voltage threshold, below which, a cell cannot be recharged. In one exemplary embodiment, the cell voltage threshold is 3.0 volts, in another embodiment, the cell voltage threshold is 2.3 volts. Neither of these are considered to be limiting on the scope of disclosed cell voltage threshold. Therefore, the comparison at 106 is made to determine if each of the cells are above or below the threshold for cell recharging.

At 108, the charge load is connected across each cell that is determined to have a voltage above the predetermined cell voltage threshold. In an embodiment, the discharge loads are connected by one or more switches that operate between opened positioned and closed positions. The discharge load across each of the cells may further be placed in parallel to a respective cell and the discharge load comprises a plurality of loads in parallel with the respective cell. By placing multiple discharge loads in parallel to each cell, heat may be more effectively dissipated, resulting in reducing a risk of overheating the battery during cell discharge.

At 110, any of the cells that are determined to be below the predetermined cell voltage threshold have their respective discharge loads disconnected from the cells. Similar to that as disclosed above, the discharge load may be connected to the cells in parallel through one or more switches that are operable by a control signal provided by a controller. By opening the switches that connect the discharge loads across their respective cells, the discharge loads are disconnected from the cells and therefore these cells are no longer discharged.

At 112, the determination is made whether or not all of the cells are below the predetermined cell voltage threshold, and thus is connected from their respective discharge loads. If any of the cells still remain above the predetermined cell voltage threshold, and thus are still connected to a discharge load, then the method returns to 104 to continue to monitor the voltage across each of the cells. If all of the cells are below the voltage thresholds, and the discharge loads are therefore disconnected from each of the cells, then the method continues to 114 to provide an indication that the battery is safe for disposal.

At 114, an indication is provided that identifies that the cells are safe for disposal. In one embodiment, the indication is presented on an OLED graphical display. In a still further embodiment, the indication is provided as an eliminated LED or other visual indicator. This indication identifies to a user both that the battery pack is no longer functional as a rechargeable source of energization; but also informs the user that the battery pack is safe for disposal with reduced associated risks of fire or damage when the battery is disposed.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

What is claimed is:

1. A battery pack comprising:
a plurality of cells, wherein the plurality of cells includes a first cell and a second cell connected in series;
a discharge circuit electrically connected to the plurality of cells, wherein the discharge circuit comprises:
a first discharge load selectively connected in parallel to the first cell;
a second discharge load selectively connected in parallel to the second cell;
a first switch that selectively connects the first discharge load, in parallel to the first cell; and
a second switch that selectively connects the second discharge load in parallel to the second cell;
an input device that: when activated, produces a battery discharge signal;
a computer processor electrically connected to the discharge circuit and to the input device, the computer processor operates the first switch and the second switch in response to the battery discharge signal to simultaneously connect the first and second discharge loads in parallel to the respective first and second cells, the computer processor further receives a first voltage across the first cell and a second voltage across the second cell and compares the first and second voltages to a minimum recharge voltage, and when the first voltage and the second voltage fall below the minimum recharge voltage, the computer processor operates the first switch and the second switch to selectively disconnect the first and second discharge loads from the respective first and second cells.

2. The battery of claim 1, further comprising a first voltmeter connected across the first cell and a second voltmeter connected across the second cell, wherein the first voltmeter provides the first voltage to the computer processor and the second voltmeter provides the second voltage to the computer processor.

3. The battery of claim 1, wherein the computer processor measures the first voltage across the first cell and the second voltage across the second cell.

4. The battery of claim 1, wherein the first discharge load and the second discharge load each comprise a plurality of discharge loads connected in parallel.

5. The battery of claim 1, further comprising a temperature sensor connected to the discharge circuit and to the computer processor, wherein the temperature sensor provides a temperature measurement to the computer processor and the computer processor compares the temperature measurement to a predetermined temperature threshold and operates the first and second switches to selectively disconnect the first and second discharge loads from the first and second cells if the temperature measurement exceeds the predetermined temperature threshold.

6. The battery of claim 1, further comprising a graphical display, and the computer processor operates the graphical display to provide an indication of a connection status of the first and second switches.

7. The battery of claim 1, further comprising a visual indicator operable by the computer processor, the visual indicator produces a visual indication once the first discharge load is disconnected from the first cell and the second discharge load is disconnected from the second cell, the visual indication indicative of the battery pack being safe for disposal.

8. The battery of claim 1, wherein minimum recharge voltage is in a range between 2.3 volts and 3 volts.

9. A system comprising:
a battery with a plurality of cells, including at least a first cell and a second cell;
a discharge circuit connected to the battery, the discharge circuit including a first discharge load selectively connected to the first cell in parallel by a first switch and a second discharge load selectively connected to the second cell in parallel by a second switch; and
an input device that produces a discharge signal upon activation of the input device;
a controller connected to the discharge circuit, wherein when the controller receives the discharge signal, the controller operates the discharge circuit to connect the first discharge load to the first cell and to simultaneously connect the second discharge load to the second cell, the controller includes a first voltmeter that measures a first voltage across the first cell and a second voltmeter that measures a second voltage across the second cell, wherein the controller compares the first and second voltages to a predetermined threshold cell voltage, operates the first switch to disconnect the first discharge load from the first cell when the first voltage falls below the predetermined threshold cell voltage, and operates the second switch to disconnect the second discharge load from the second cell when the second voltage falls below the predetermined threshold cell voltage.

10. The system of claim 9, wherein the controller operates the first and second switches until both of the first and second discharge loads are disconnected.

11. The system of claim 9, wherein the controller operates the first switch to disconnect the first discharge load when the first voltage falls below the predetermined threshold cell voltage and operates the second switch to disconnect the second discharge load when the second voltage falls below the predetermined threshold cell voltage.

12. The system of claim 9, further comprising a visual indicator operable by the controller, the visual indicator produces a visual indication once the first and second discharge loads are disconnected from the first and second cells.

13. A method of discharging a battery with a first cell and a second cell for safe disposal, the method including:
receiving, with a processor, a discharge signal;
upon receiving the discharge signal, operating a first switch and a second switch, with the processor, to simultaneously connect a first discharge load in parallel to the first cell and a second discharge load in parallel to the second cell;
monitoring a first voltage across the first cell;
monitoring a second voltage across the second cell;
comparing, with the processor, the first voltage and the second voltage to a predetermined cell voltage threshold, the predetermined cell voltage threshold representative of a safe cell voltage for battery disposal;
disconnecting the first discharge load from the first cell and the second discharge load from the second cell when the first and second voltages fall below the predetermined cell voltage threshold; and
upon disconnecting the first and second discharge loads, producing a visual indication that the battery is safe for disposal.

14. The method of claim 13, further comprising:
measuring a temperature of the first discharge load with a first temperature sensor;
measuring a temperature of the second discharge load with a second temperature sensor; and disconnecting the first discharge load from the first cell or the second discharge load from the second cell if the measured temperature is determined to be an excessive temperature.

* * * * *